United States Patent
Hsu

Patent Number: 6,112,759
Date of Patent: Sep. 5, 2000

[54] OIL DRAWING AND DISPENSING DEVICE

[76] Inventor: Huan-Ling Hsu, No. 109, Tien Shyang Street, Bei Twen Dist., Taichung City, Taiwan

[21] Appl. No.: 09/240,818

[22] Filed: Feb. 1, 1999

[30] Foreign Application Priority Data

Aug. 26, 1998 [TW] Taiwan ................................. 87213999

[51] Int. Cl.[7] ..................................................... F04F 10/00
[52] U.S. Cl. ......................... 137/148; 222/465.1; 141/26; 141/67
[58] Field of Search ................................. 222/465.1, 396, 222/397; 137/148, 149; 141/25, 26, 67

[56] References Cited

U.S. PATENT DOCUMENTS

| | | | |
|---|---|---|---|
| 104,641 | 6/1870 | Pitman ..................................... | 137/148 |
| 108,087 | 8/1870 | Averell et al. ........................... | 137/148 |
| 503,232 | 8/1893 | Franklin ................................... | 137/148 |
| 1,308,101 | 7/1919 | Oftedahl .................................. | 137/148 |
| 1,582,399 | 4/1926 | Helander ................................. | 137/148 |

*Primary Examiner*—Philippe Derakshani
*Attorney, Agent, or Firm*—Charles E. Baxley, Esq

[57] ABSTRACT

A drawing and dispensing device includes a container for receiving a liquid and having an opening coupled to a pipe for drawing a liquid into the container. A check valve is attached to the port. A pump device is attached to the check valve for pumping the liquid into the container. The check valve includes a plate having one or more orifices, and a resilient panel attached to the plate for blocking the-orifice and for allowing air to be drawn out of the container only and for preventing the air from flowing into the container via the check valve. A balancing valve is attached to the container for balancing the pressure in the container and for preventing the container from being deformed.

6 Claims, 5 Drawing Sheets

OIL DRAWING AND DISPENSING DEVICE

BACKGROUND OF THE INVENTION

1. Field of the Invention

The present invention relates to an oil container, and more particularly to an oil drawing and dispensing device.

2. Description of the Prior Art

Typically, people may not easily obtain and fill gasolene into a vehicle when the vehicle has run out of gasolene. In addition, people also may not draw the oil out of the oil tank easily when it is required to change the oil. People usually have to lift the front portion of the vehicle upward, and move into the tiny space below the bottom portion of the vehicle, such that the user may not easily change the oil.

The present invention has arisen to mitigate and/or obviate the afore-described disadvantages of the conventional oil changing problems and the gasolene filling problems.

SUMMARY OF THE INVENTION

The primary objective of the present invention is to provide an oil drawing and dispensing device for allowing the user to easily draw the oil or the gasolene and to easily fill the oil and the gasolene into the oil tank and the gasolene tank.

In accordance with one aspect of the invention, here is provided a drawing and dispensing device comprising a container for receiving a liquid, the container including an opening and a port provided therein, a pipe including a first end secured to the opening and including a second end for engaging into a liquid tank, a check valve attached to the port, and means for pumping the liquid from the liquid tank into the container.

The check valve includes a plate attached to the port, the plate includes at least one orifice communicating with the container, and a resilient panel attached to the plate for blocking the orifice and for preventing air from flowing into the container via the panel. A pin is further provided for attaching the resilient panel to the plate. The pin includes a cone-shaped end for engaging with the plate and for preventing the resilient panel from being disengaged from the plate.

A balancing means is further provided for balancing a pressure in the container. The balancing means includes a body secured to the container and having a bore, a stem slidably received in the bore and having a head for blocking the bore of the body, and means for biasing the head to blocking the bore of the body, the head is forced to be disengaged from the bore of the body when the pressure in the container is lower than that in an environment out of the container.

A mouth is further provided for attaching to the opening and for filling the liquid in the container to the liquid tank.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
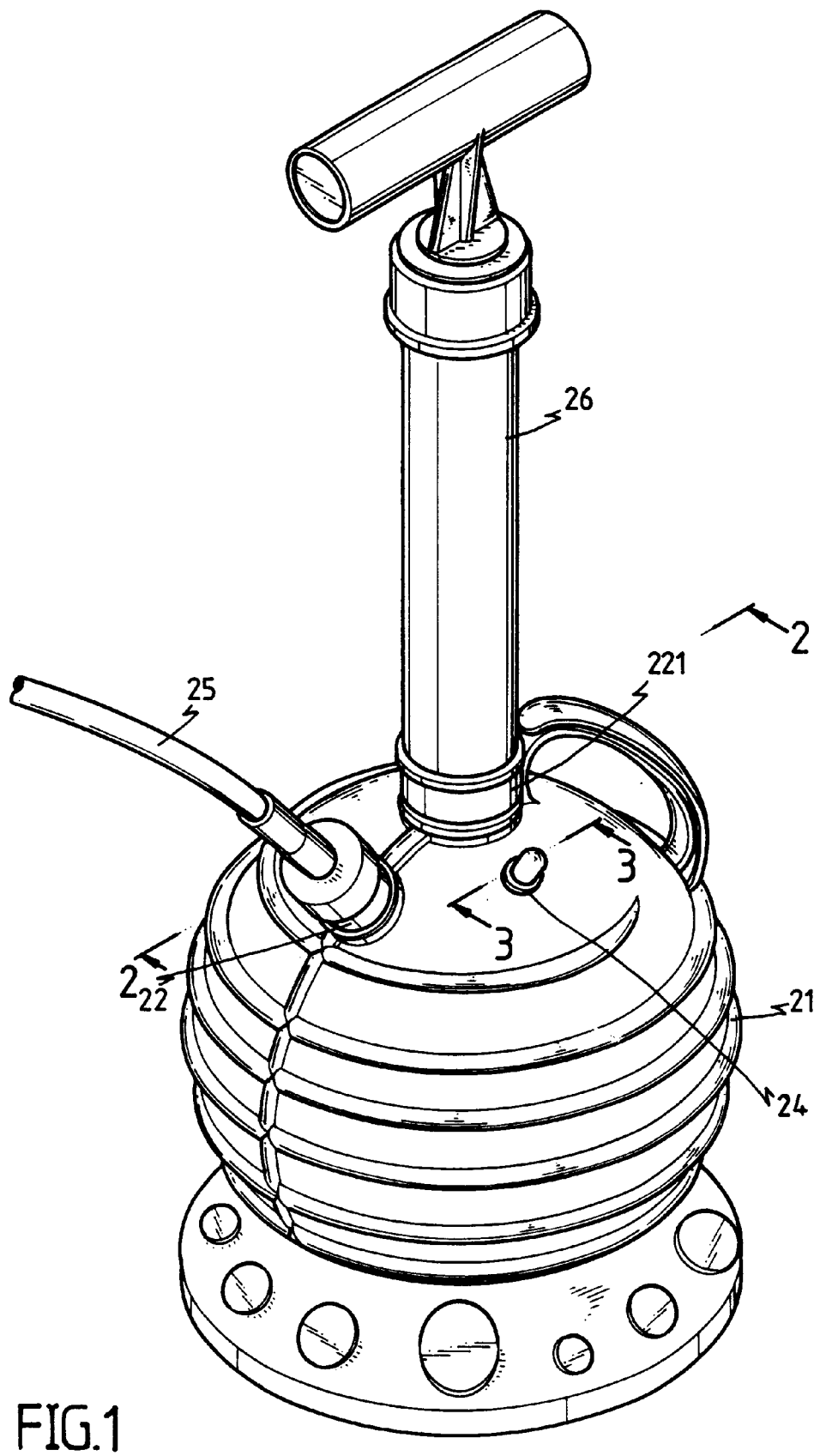
FIG. 1 is a perspective view of an oil drawing and dispensing device in accordance with the present invention.
Figure 2:
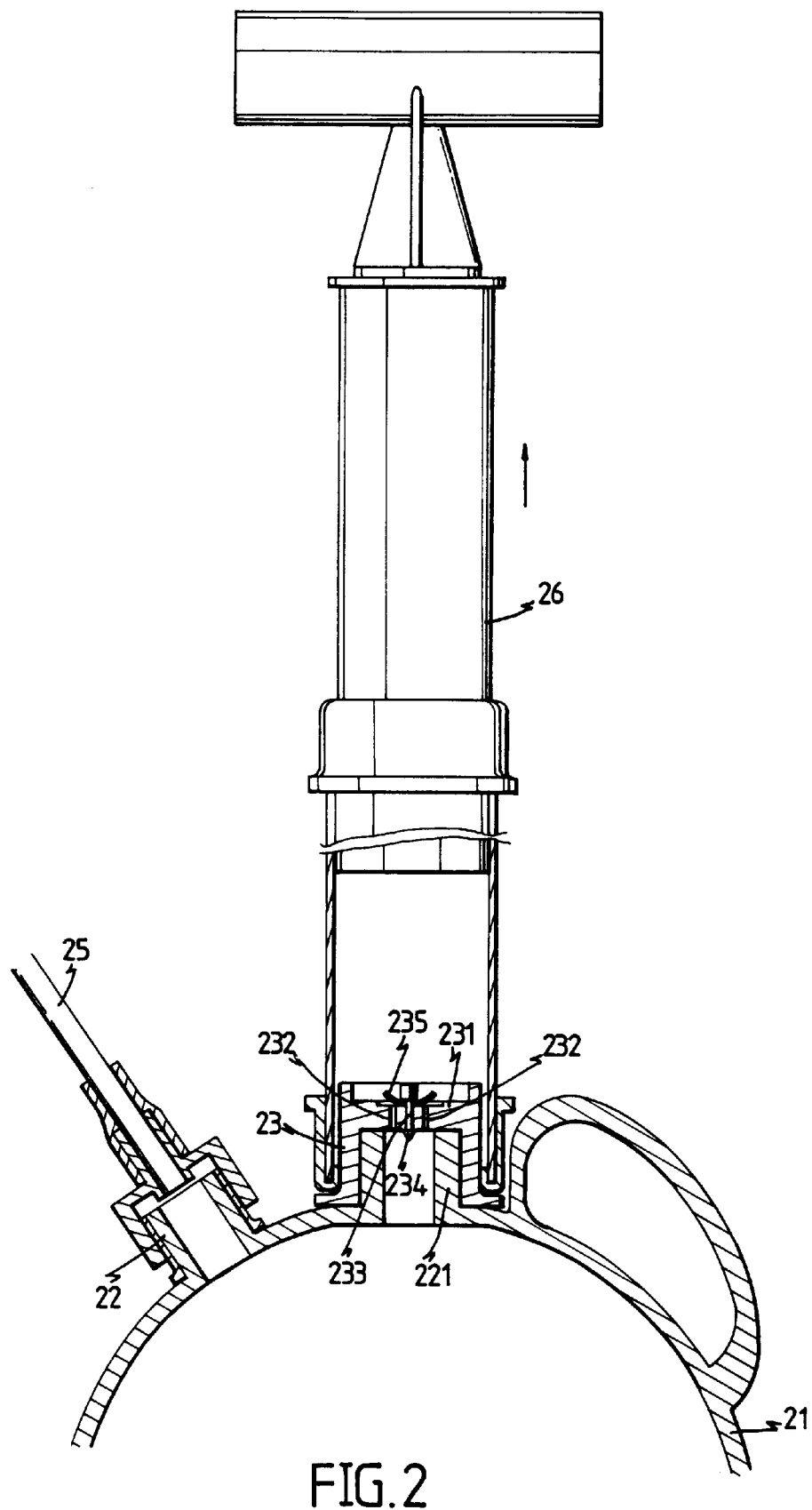
FIG. 2 is a cross sectional view taken along lines 2—2 of FIG. 1.

Referring to the drawings, and initially to FIGS. 1 and 2, an oil drawing and dispensing device in accordance with the present invention comprises a container 21 having any suitable shape. The container 21 includes an opening 22 and a port 221 provided in the upper openingion thereof. The container 21 is used for receiving a liquid, particularly the gasolene or the oil. A pipe 25 has one end secured to the opening 22 and has the other end for engaging into the oil tank or the gasolene tank for drawing the oil or the gasolene into the container 21. A check valve 23 is attached to the port 221 and includes a, plate 231 disposed on the port 221. The plate 231 includes one or more orifices 232 communicating with the interior of the container 21. A resilient panel 235 is disposed on top of the plate 231 and loosely secured to the plate 231 with a pin 233 which includes a cone-shaped end 234 for engaging with the plate 231 and for preventing the pin 233 and the panel 235 from being disengaged from the plate 231. The resilient panel 235 nay be provided for blocking the orifices 232 and for preventing air from flowing into the container 21 via the check valve 23; but, the air in the container 21 is allowed to flow out of the container 21 via the check valve 23. A pump 26 is attached to the port 221 for drawing the gasolene or the oil into the container 21 when the pump 26 is actuated in a reciprocating pumping action. The oil or the gasolene in the oil tank or the gasolene tank may thus be easily drawn into the container 21.

The oil drawing and dispensing device is particularly suitable for people to draw the gasolene from the other vehicle when his vehicle has run out of gasolene. This device is also good for drawing the oil out from the oil tank for changing the oil.

Figure 3:
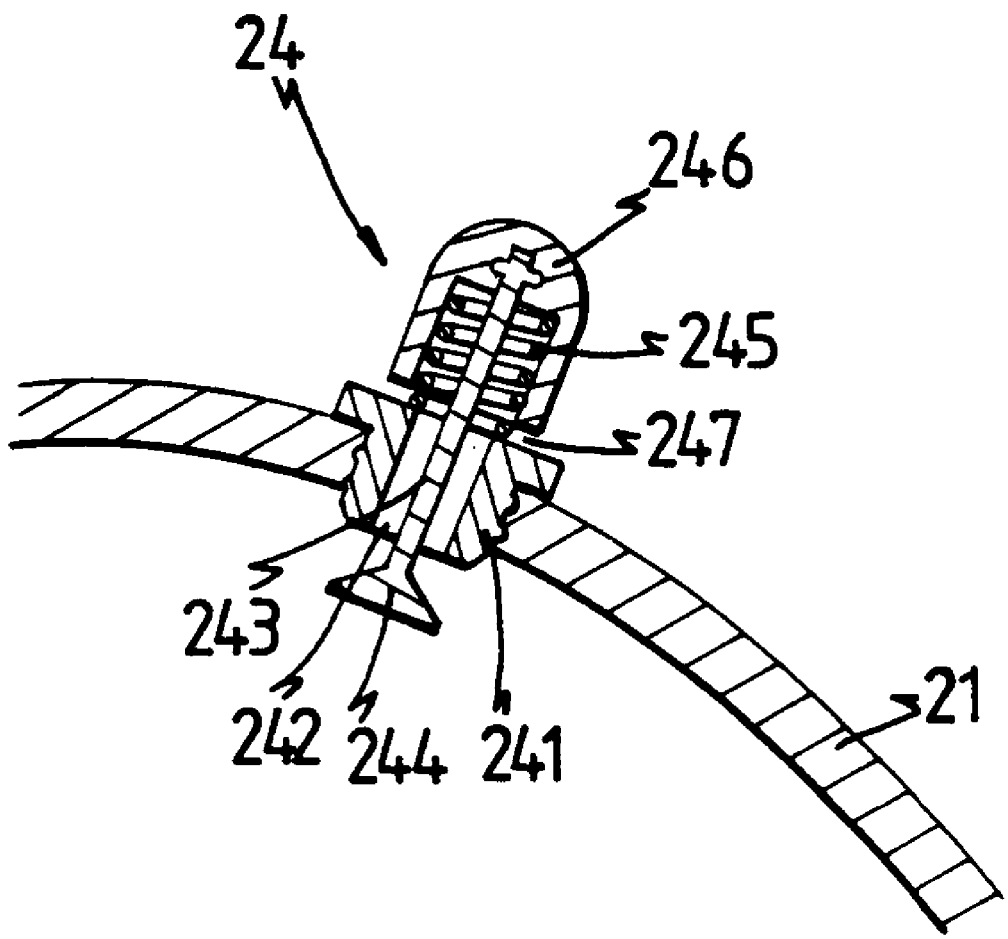
FIG. 3 is a cross sectional view taken along lines 3—3 of FIG. 1.

Referring next to FIG. 3 and again to FIG. 1, a valve 24 is attached to the container 21 and includes a body 241 secured to the container 21 by retaining flanges or by welding process, or by force-fitted engagement. The body 241 includes a bore 242 for slidably receiving a stem 243 which includes an enlarged head 244 formed in the bottom for blocking the bore 242. A cap 246 is secured on top of the stem 243 and a spring 245 is disposed between the cap 246 and the body 241 for biasing the head 244 to block the bore 242. In operation, when the oil of high temperature is drawn into the container 21, the pressure in the container 21 may be reduced to a pressure below the environment pressure. At this moment, the pressure in the environment is greater th[ ]an that of the container 21 such that the head 244 may be forced to be separated from the body 241 by the environment pressure and such taht the air in the environment may flow into the container 21 to balance the pressure in the container 21. The container 21 may thus be prevented from being deformed.

Figure 4:
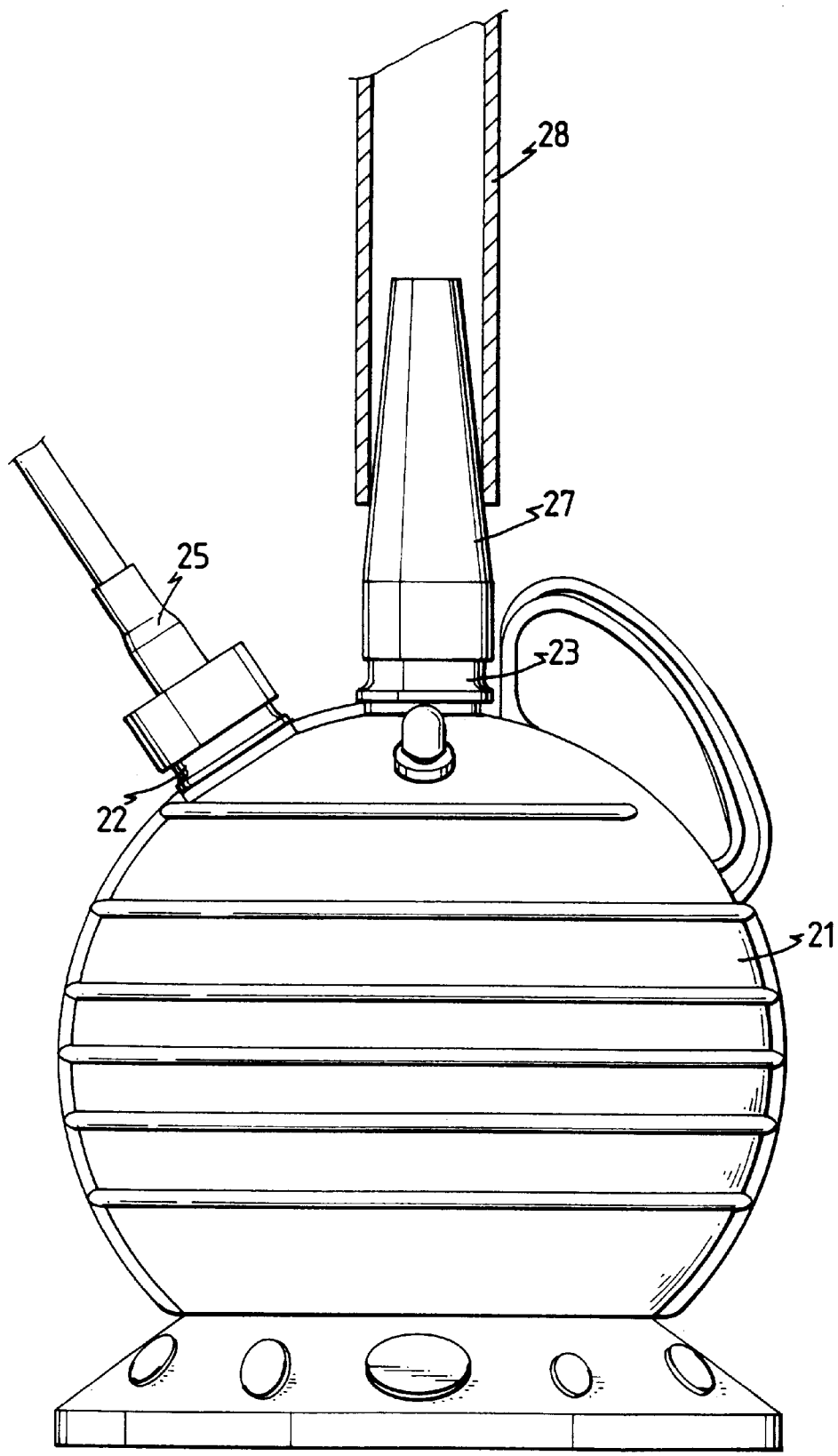
FIGS. 4 and 5 are schematic views illustrating the operation of the oil drawing and dispensing device.
Figure 5:
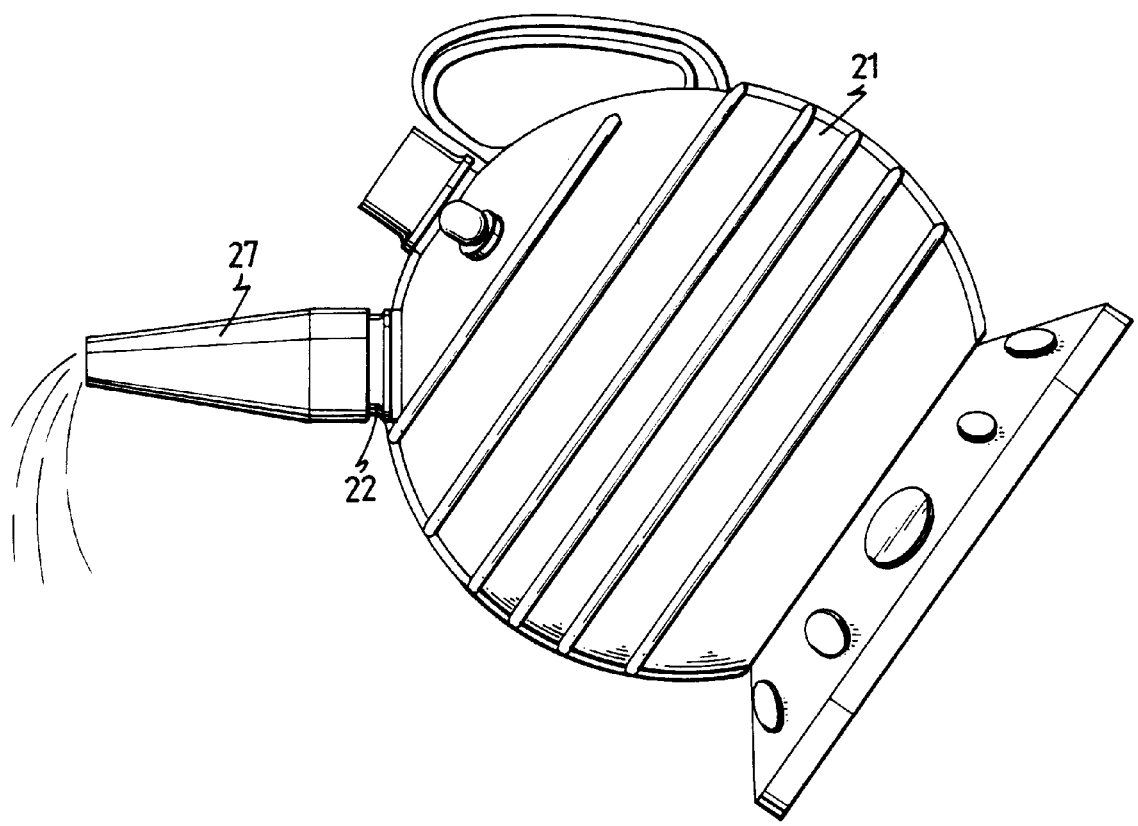

Referring next to FIG. 4, when the pump 26 is removed and when a mouth 27 is attached to the check valve 23, a hose 28 of a drawing device, such as a vacuum cleaner, may be attached to the mouth 27 for drawing the oil or the gasolene out of the oil tank or the gasolene tank by the vacuum cleaner. When it is required to fill the oil or the gasolene into the oil tank or the gasolene tank, as shown in FIG. 5; the pump 26 and the hose 28 are required to be removed from the port 221, and the mouth 27 may be attached to the opening 22 for allowing the oil or the gasolene to be easily filled into the oil tank or the gasolene tank.

Accordingly, the oil drawing and dispensing device in accordance with the present invention may be used for allowing the user to easily draw the oil or the gasolene and to easily fill the oil and the gasolene into the oil tank and the gasolene tank.

Although this invention has been described with a certain degree of particularity, it is to be understood that the present disclosure has been made by way of example only and that numerous changes in the detailed construction and the combination and arrangement of parts may be resorted to, without departing from the spirit and scope of the invention as hereinafter claimed.

I claim:

1. A drawing and dispensing device comprising:

a container for receiving a liquid, said container including an opening and a port provided therein, a pipe including a first end secured to said opening and including a second end for engaging into a liquid tank, a check valve attached to said port, and means for pumping the liquid from the liquid tank into said container, wherein said check valve includes a plate attached to said port, said plate includes at least one orifice communicating with said container, and a resilient panel attached to said plate for blocking said at least one orifice and for preventing air from flowing into said container via said panel.

2. The drawing and dispensing device as claimed in claim 1 further comprising a pin for attaching said resilient panel to said plate.

3. The drawing and dispensing device as claimed in claim 2, wherein said pin includes a cone-shaped end for engaging with said plate and for preventing said resilient panel from being disengaged from said plate.

4. The drawing and dispensing device as claimed in claim 1 further comprising means for balancing a pressure in said container.

5. The drawing and dispensing device as claimed in claim 4, wherein said balancing means includes a body secured to said container and having a bore, a stem slidably received in said bore and having a head for blocking said bore of said body, and means for biasing said head to blocking said bore of said body, said head is forced to be disengaged from said bore of said body when the pressure in said container is lower than that in an environment out of said container.

6. A drawing and dispensing device comprising:

a container for receiving a liquid, said container including an opening and a port provided therein, a pipe including a first end secured to said opening and including a second end for engaging into a liquid tank, a check valve attached to said port, means for pumping the liquid from the liquid tank into said container, and a mouth for attaching to said opening and for filling the liquid in said container to the liquid tank.

\* \* \* \* \*